United States Patent
Yamazaki et al.

(10) Patent No.: US 6,384,171 B1
(45) Date of Patent: May 7, 2002

(54) COATING COMPOSITION AND COATED SILICONE RUBBER MEMBER

(75) Inventors: Toshio Yamazaki; Tsutomu Nakamura; Takeo Yoshida, all of Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/615,738

(22) Filed: Jul. 13, 2000

(30) Foreign Application Priority Data

Jul. 14, 1999 (JP) .......................................... 11-200283

(51) Int. Cl.⁷ .............................................. C08G 77/08
(52) U.S. Cl. ............................. 528/15; 528/31; 528/28; 428/447
(58) Field of Search .............................. 528/15, 28, 31; 428/447

(56) References Cited

U.S. PATENT DOCUMENTS 5,296,144 A * 3/1994 Sternina et al. ............. 210/490

* cited by examiner

*Primary Examiner*—Margaret G. Moore
(74) *Attorney, Agent, or Firm*—Millen, White, Zelano & Branigan, P.C.

(57) ABSTRACT

A coating composition comprising (A) a urethane polymer having at least one aliphatic unsaturated hydrocarbon group on a side chain in a molecule, (B) an organohydrogenpolysiloxane having at least two hydrosilyl groups in a molecule, and (C) a hydrosilylation catalyst firmly bonds to surfaces of various substrates, especially silicone rubber substrates, without a need for pre-treatment and readily forms thereon a surface protective layer having wear resistance. A silicone rubber member in which a silicone rubber substrate is coated on its surface with the inventive coating composition is endowed on the surface with wear resistance and is useful as silicone rubber key pads and silicone rubber rolls.

12 Claims, No Drawings

COATING COMPOSITION AND COATED SILICONE RUBBER MEMBER

This invention relates to urethane resin coating compositions which effectively bond to surfaces of various substrates, especially silicone rubber substrates, to form a surface protective layer having improved wear resistance thereon, and silicone rubber members surface protected with the coating compositions.

BACKGROUND OF THE INVENTION

Cellular phones and remote controllers have silicone rubber key pads. On the top of the keys, characters or images are often printed with silicone rubber base ink having satisfactory bonding and coloring abilities (a character ink layer). The character ink layer subject to key touch is worn by contact with fingers whereby the characters become blurred and unreadable. It is also a problem that sweat components such as water, salts and oil are conveyed from the fingers to the silicone rubber key pad whereupon they penetrate through the pad to cause contact failure.

As the rolls in electrophotographic copiers and printers, silicone rubber rolls are commonly used because they are highly heat resistant and their properties such as hardness and elasticity can be adjusted over a wide range. Silicone rubber, however, lacks print durability due to poor wear resistance. During service, a minor amount of low-molecular-weight siloxane contained in the silicone rubber oozes out on the surface, degrading the image quality of the print.

One common approach for imparting wear resistance or providing a countermeasure against contact failure or low-molecular-weight siloxane is to apply a resin coating material to such a silicone rubber member to form a surface protective layer. More particularly, it was proposed to use as the resin coating material a urethane resin characterized by very good wear resistance and minimized penetration of water, salts, oil and low-molecular-weight siloxane.

However, the urethane resin gives rise to a problem when the substrate is silicone rubber having parting properties. Unless the surface of silicone rubber substrate is subjected to cumbersome pre-treatment such as primer treatment, ozone treatment or etching, the urethane resin does not adhere to the substrate surface and thus fails to exert wear resistance. It is desired to overcome this problem.

SUMMARY OF THE INVENTION

An object of the invention is to provide a coating composition which firmly bonds to a variety of substrates, especially silicone rubber substrates, and readily forms thereon a surface protective layer having improved wear resistance. Another object of the invention is to provide a silicone rubber member which is surface treated with the coating composition.

It has been found that by blending (A) a urethane polymer having at least one aliphatic unsaturated hydrocarbon group on a side chain in a molecule, (B) an organohydrogenpolysiloxane having at least two hydrosilyl groups in a molecule, and (C) a hydrosilylation catalyst, there is obtained a coating composition which firmly bonds to a variety of substrates, especially silicone rubber substrates, and readily forms thereon a surface protective layer having improved wear resistance without a need for cumbersome pre-treatment. When (D) a polyfunctional isocyanate compound is further blended, the coating composition can form a surface protective layer of higher quality having better adhesion. A silicone rubber member having a surface protective layer formed of the coating composition is effectively utilized as key pads and rolls in copiers and printers.

Among a variety of silicone rubbers, millable silicone rubbers and injection molding liquid silicone rubbers are typical silicone rubbers for use as key pads and rolls. The vulcanizing and crosslinking mechanisms of these rubbers are peroxide vulcanization and hydrosilylation crosslinking, respectively. The peroxide vulcanization generally follows the mechanism that radicals originating from a peroxide act on vinyl groups in silicone gum for effecting crosslinking, leaving some unreacted vinyl groups in the rubber after curing. In the hydrosilylation crosslinking, a vinyl-containing silicone fluid and a hydrosilyl-containing crosslinking agent are reacted in the presence of a hydrosilylation catalyst, leaving some unreacted vinyl and/or hydrosilyl groups in the rubber after curing.

When the urethane resin coating composition of the invention is applied to a surface of such silicone rubber, the components of the coating composition partially penetrate into the silicone rubber. Then hydrosilylation reaction takes place in a combined fashion among aliphatic unsaturated hydrocarbon groups in the urethane polymer (A), hydrosilyl groups in the organohydrogenpolysiloxane (B), and residual vinyl and/or hydrosilyl groups in the silicone rubber in the presence of the hydrosilylation catalyst (C), accomplishing an anchoring effect near the surface of silicone rubber. Through this mechanism, the composition forms a firm bond to a variety of substrates, especially silicone rubber substrates.

When the polyfunctional isocyanate compound (D) is further blended, terminal hydroxyl or amino groups in the urethane polymer (A) react with isocyanate groups in the polyfunctional isocyanate compound (D) to form a three-dimensional structure. Consequently, the urethane resin is further improved in properties and adhesion.

Accordingly, the invention provides a coating composition comprising (A) 100 parts by weight of a urethane polymer having at least one aliphatic unsaturated hydrocarbon group on a side chain in a molecule, (B) 0.1 to 100 parts by weight of an organohydrogenpolysiloxane having at least two hydrosilyl groups in a molecule, and (C) a catalytic amount of a hydrosilylation catalyst. In a referred embodiment, the coating composition further includes (D) 1 to 150 parts by weight of a polyfunctional isocyanate compound.

Also contemplated herein is a silicone rubber member comprising a silicone rubber substrate and a surface protective layer of the above-defined coating composition formed on a surface of the substrate.

DESCRIPTION OF THE PREFERRED EMBODIMENT

Component (A) of the coating composition according to the invention is a urethane polymer having at least one aliphatic unsaturated hydrocarbon group on a side chain in a molecule.

The urethane polymer (A) is preferably obtained by reacting (a) a straight chain polymer having a hydroxyl or amino group at each end and at least one aliphatic unsaturated hydrocarbon group on a side chain, preferably 1 to 50, and more preferably 2 to 20 aliphatic unsaturated hydrocarbon groups on side chains with (b) a difunctional isocyanate compound. In this reaction, the molar ratio of terminal functional groups in the respective reactants, that is, (terminal hydroxyl or amino groups in reactant (a))/(NCO groups in reactant (b)), simply represented by (a)/(b), is set greater than 1.0, preferably 2.0≧(a)/(b)>1.0.

Examples of the straight chain polymer (a) having a hydroxyl or amino group at each end and at least one aliphatic unsaturated hydrocarbon group on a side chain include diols such as polyether diols, polyester diols and polycarbonate diols, and modified polysiloxanes such as both end carbinol-modified polysiloxanes and both end amino-modified polysiloxanes. They may be used alone or in admixture of two or more.

Exemplary polyether diols are represented by the following general formula (1).

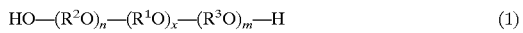

$$HO-(R^2O)_n-(R^1O)_x-(R^3O)_m-H \qquad (1)$$

Herein, $R^1$ is a residue of a dihydric alcohol; $R^2$ and $R^3$ are independently a ring-opened residue of a cyclic alkylene oxide; and any one of $R^1$, $R^2$ and $R^3$ is a group having an aliphatic unsaturated hydrocarbon group on a side chain. Letter x is equal to 0 or 1, each of n and m is an integer of at least 1, preferably 1 to 300, more preferably 5 to 100, and further preferably 10 to 50.

Exemplary polyester diols are represented by the following general formulae (2) and (3).

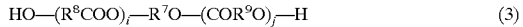

$$HO-(R^4O-COR^5COO)_k R^6OH \qquad (2)$$

$$HO-(R^8COO)_i-R^7O-(COR^9O)_j-H \qquad (3)$$

Herein, $R^4$, $R^6$ and $R^7$ are independently a residue of a dihydric alcohol; $R^5$ is independently a residue of a difunctional carboxylic acid; $R^8$ and $R^9$ are independently a ring-opened residue of lactone; and any one of $R^4$, $R^5$ and $R^6$ and any one of $R^7$, $R^8$ and $R^9$ are groups having an aliphatic unsaturated hydrocarbon group on a side chain. Letter k is an integer of at least 1, preferably 1 to 100, more preferably 2 to 50, and further preferably 5 to 20; i and j are integers satisfying i+j>0, preferably 200≧i+j>0, more preferably 100≧i+j≧5, and further preferably 50≧i+j≧10.

Exemplary polycarbonate diols are represented by the following general formula (4).

$$HO-(R^{10}OCOO)_h-R^{11}OH \qquad (4)$$

Herein, $R^{10}$ and $R^{11}$ are independently a residue of a dihydric alcohol, and any one of $R^{10}$ and $R^{11}$ is a group having an aliphatic unsaturated hydrocarbon group on a side chain. Letter h is an integer of at least 1, preferably 1 to 200, more preferably 5 to 100, and further preferably 10 to 50.

The aliphatic unsaturated hydrocarbon group in the above formulae representing the diols is not critical insofar as it can react with a hydrosilyl group in the presence of a hydrosilylation catalyst to form a silicon-to-carbon bond. Preferred aliphatic unsaturated hydrocarbon groups are alkenyl groups of 2 to 8 carbon atoms, especially 2 to 6 carbon atoms, for example, vinyl, allyl, propenyl, butenyl and hexenyl. Among others, those groups having a carbon-to-carbon double bond at an end, especially vinyl and allyl groups are preferred.

The diol having such a substituent incorporated therein can be prepared in a conventional manner using a dihydric alcohol and a cyclic alkylene oxide, difunctional carboxylic acid or lactone and also using as part or the entirety of these reactants a dihydric alcohol, cyclic alkylene oxide, difunctional carboxylic acid or lactone having an aliphatic unsaturated hydrocarbon group on a side chain.

In the above-described diols, the dihydric alcohols leaving residues represented by $R^1$, $R^4$, $R^6$, $R^7$, $R^{10}$ and $R^{11}$ are preferably those of 2 to 10 carbon atoms, for example, ethylene glycol, propylene glycol, 1,3-propane diol, 1,3-butane diol, 1,4-butane diol, hexamethylene glycol, bisphenol A, and hydroquinone.

The cyclic alkylene oxides leaving residues represented by $R^2$ and $R^3$ are preferably those of 2 to 10 carbon atoms, for example, ethylene oxide, propylene oxide, tetrahydrofuran and styrene oxide.

The difunctional carboxylic acids leaving residues represented by $R^5$ are preferably those of 2 to 18 carbon atoms, for example, oxalic acid, malonic acid, succinic acid, maleic acid, acetylene dicarboxylic acid, glutaric acid, adipic acid, pimelic acid, suberic acid, sebacic acid, phthalic acid, isophthalic acid, terephthalic acid, and cyclohexanedicarboxylic acid.

Examples of the lactones leaving residues represented by $R^8$ and $R^9$ are propiolactone, butyrolactone and caprolactone.

Exemplary both end carbinol-modified polysiloxanes are represented by the following general formula (5).

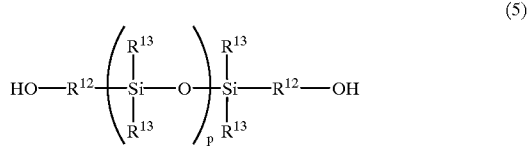

Herein, $R^{12}$ is a divalent organic group, $R^{13}$ is a monovalent organic group, and at least one of the $R^{13}$ groups in a molecule is an aliphatic unsaturated hydrocarbon group. Letter p is an integer of at least 1, preferably 1 to 200, more preferably 5 to 100, and further preferably 10 to 50.

Exemplary both end amino-modified polysiloxanes are represented by the following general formula (6).

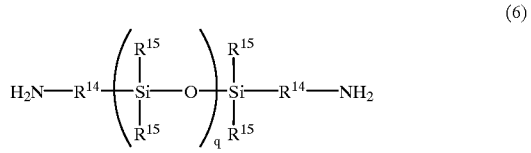

Herein, $R^{14}$ is a divalent organic group, $R^{15}$ is a monovalent organic group, and at least one of the $R^{15}$ groups in a molecule is an aliphatic unsaturated hydrocarbon group. Letter q is an integer of at least 1, preferably 1 to 200, more preferably 5 to 100, and further preferably 10 to 50.

The aliphatic unsaturated hydrocarbon group in the above formulae (5) and (6) is not critical insofar as it can react with a hydrosilyl group in the presence of a hydrosilylation catalyst to form a silicon-to-carbon bond. Preferred aliphatic unsaturated hydrocarbon groups are as exemplified above.

The preferred divalent organic groups represented by $R^{12}$ and $R^{14}$ are those of 1 to 12 carbon atoms, especially 1 to 8 carbon atoms, for example, divalent hydrocarbon groups such as alkylene groups which may be separated by an oxygen atom or a substituted or unsubstituted imino group such as NH, N—CH$_3$ or N—C$_6$H$_5$, e.g., methylene, ethylene, propylene, hexylene, and propyleneoxyethylene groups.

The preferred monovalent organic groups represented by $R^{13}$ and $R^{15}$ are unsubstituted monovalent hydrocarbon groups of 1 to 12 carbon atoms, especially 1 to 8 carbon atoms including alkenyl groups as mentioned above, alkyl groups such as methyl, and aryl groups such as phenyl, and substituted monovalent hydrocarbon groups obtained by replacing some of the hydrogen atoms in the foregoing unsubstituted monovalent hydrocarbon groups by halogen atoms, amino groups or mono or dialkylamino groups.

Of the straight chain polymers (a), those having a siloxane bond are preferred. For example, both end carbinol-modified polysiloxanes and both end amino-modified polysiloxanes are advantageously used.

In the preparation of the urethane polymer (A), a low molecular weight chain extender may be reacted as part of the straight chain polymer (a) having a hydroxyl or amino group at each end and at least one aliphatic unsaturated hydrocarbon group on a side chain. Examples of the low molecular weight chain extender include aliphatic diols such as ethylene glycol and propylene glycol, aromatic diols such as bisphenol A and hydroquinone, N-substituted dialkanolamines such as N-methyldiethanolamine, N-ethyldiethanolamine, and N-phenyldiethanolamine, and aminoalcohols such as 2-aminoethanol and 3-amino-1-propanol. They may be used alone or in admixture of two or more. It is acceptable to use a chain extender having an aliphatic unsaturated hydrocarbon substituent in a molecule. The low molecular weight chain extender is added in a conventional amount as long as the benefits of the invention are not impaired.

Examples of the difunctional isocyanate compound (b) include 2,4-tolylene diisocyanate, 2,6-tolylene diisocyanate, 1-methylcyclohexylene-2,4-diisocyanate, 1-methylcyclohexylene-2,6-diisocyanate, 4,4'-diphenylmethane diisocyanate, 4,4'-dicyclohexylmethane diisocyanate, 1,5-naphthylene diisocyanate, 3,3'-dimethyl-4,4'-biphenylene diusocyanate, xylylene diisocyanate, hydrogenated xylylene diisocyanate, isophorone diisocyanate, hexamethylene diisocyanate, 2,2,4-trimethylhexamethylene diisocyanate, and 2,4,4-trimethylhexamethylene diisocyanate, alone or in admixture of two or more. It is acceptable to use a difunctional isocyanate compound having an unsaturated hydrocarbon substituent in a molecule.

For shelf stability, it is preferred that the terminal group of the urethane polymer (A) have a hydroxyl or amino group. To this end, reactants (a) and (b) are reacted in such amounts that the molar ratio of terminal functional groups in the respective reactants, (a)/(b), is greater than 1.0, preferably $2.0 \geq (a)/(b) > 1.0$.

In order to produce the urethane polymer (A) having at least one aliphatic unsaturated hydrocarbon group on a side chain in a molecule, the above-described reactants (a) and (b) may be reacted in a suitable solvent in the presence of a urethane-forming catalyst. Examples of the solvent used herein include aliphatic solvents such as hexane and cyclohexane, aromatic solvents such as toluene and xylene, ketone solvents such as methyl ethyl ketone, methyl isobutyl ketone and cyclohexanone, ester solvents such as ethyl acetate and butyl acetate, and ether solvent such as tetrahydrofuran and 1,4-dioxane. These solvents may be used alone or in admixture of two or more. Of these, the ketone, ester and ether solvents are preferred since the urethane polymers are well soluble therein.

Examples of the urethane-forming catalyst include organic tin compounds such as dibutyltin dilaurate and stannous octoate, and amine compounds such as N,N,N',N'-tetramethyl-1,3-butanediamine, 1,4-diazabicyclo(2,2,2)-octane, and 1,8-diazabicyclo(5,4,0)undecene-7. These catalysts may be used alone or in combination of two or more. The organic tin compounds are preferably used because of high activity. The urethane-forming catalyst may be used in a catalytic amount.

In effecting reaction, a reactor is charged with reactants (a) and (b), a solvent is added for dissolving the reactants therein, and a urethane-forming catalyst is added. Then the reaction mixture is ripened at 50 to 150° C. for 1 to 10 hours. The end of reaction is identified by IR spectroscopy when the peak at 2200 to 2300 $cm^{-1}$ attributable to the isocyanate group disappears. The reaction product may be concentrated, diluted or solvent exchanged, if necessary for adjusting the viscosity, solid concentration or solvent type.

The urethane polymer (A) thus obtained preferably has a weight average molecular weight of about 10,000 to 500,000, and preferably about 50,000 to 200,000.

Component (B) is an organohydrogenpolysiloxane having at least two hydrosilyl groups in a molecule. Compounds of the following general formulae (7) and (8) are preferably used alone or in admixture of two or more.

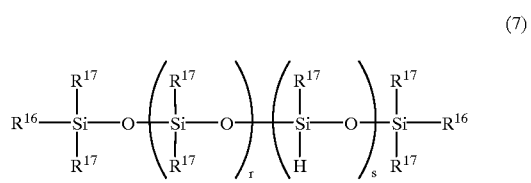

(7)

Herein, r and s are integers inclusive of 0, $R^{16}$ is hydrogen or $R^{17}$, and $R^{17}$ is a monovalent organic group. Letter s is an integer of at least 2 when both the $R^{16}$ groups are $R^{17}$; s is an integer of at least 1 when one $R^{16}$ group is $R^{17}$ and the other $R^{16}$ group is hydrogen; s is an integer of at least 0 when both the $R^{16}$ groups are hydrogen.

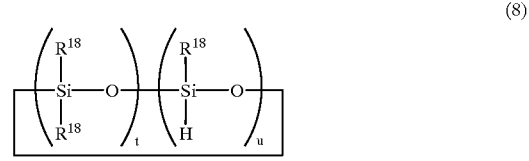

(8)

Herein $R^{18}$ is a monovalent organic group, t is an integer inclusive of 0, u is an integer of at least 2, and t+u is an integer of at least 3.

In formulae (7) and (8), the monovalent organic groups represented by $R^{17}$ and $R^{18}$ are preferably those of 1 to 12 carbon atoms, including unsubstituted monovalent hydrocarbon groups, for example, alkyl, aryl and aralkyl groups such as methyl, ethyl, propyl, phenyl, 3-glycidoxypropyl, 2-trimethoxysilylethyl, and 2-phenylpropyl. Also included are substituted monovalent hydrocarbon groups obtained by replacing some or all of the hydrogen atoms on these unsubstituted monovalent hydrocarbon groups by such substituents as halogen atoms, amino, epoxy, alkoxy, trialkylsilyl, dialkylalkoxysilyl, alkyldialkoxysilyl, and trialkoxysilyl groups. Of these, methyl is most preferred.

The letters r and s are integers inclusive of 0 although the sum of r+s is preferably up to 1,000, and especially up to 100. A too greater value of r+s means that the organohydrogenpolysiloxane (B) has a too high viscosity to mix with other components and becomes less compatible with other components, prohibiting effective progress of crosslinking reaction. The sum of t+u is preferably from 3 to 6. Since more efficient crosslinking takes place as the hydrosilyl group content per molecule represented by s/(t+s) or u/(t+u) increases, it is especially preferred that r=0 and t=0.

The organohydrogenpolysiloxane (B) having at least two hydrosilyl groups in a molecule is used in an amount of 0.1 to 100 parts, preferably 1 to 50 parts by weight (as solids) per 100 parts by weight (as solids) of the urethane polymer (A). Less amounts of component (B) may not enable the composition to be adhesive whereas excessive amounts of component (B) may result in a surface protective layer which is soft and less wear resistant.

Component (C) is a hydrosilylation catalyst. Included are complexes of noble metals such as platinum, palladium, iridium, rhodium, osmium, and ruthenium, organic peroxides such as benzoyl peroxide, dicumyl peroxide and di-tert-butyl peroxide, and azo compounds such as 2,2'-azobisisobutyronitrile, 2,2'-azobis(2-methylbutyronitrile), and 2,2'-azobis(2,4-dimethylvaleronitrile). They may be used alone or in admixture of two or more. Usually, platinum complexes are preferable since they are highly active and easy to handle. Especially an alcohol solution of chloroplatinic acid and a chloroplatinic acid solution having an aliphatic unsaturated hydrocarbon group-bearing compound coordinated thereto after neutralization are advantageously used.

The hydrosilylation catalyst is used in a catalytic amount, preferably 0.001 to 0.1 part by weight per 100 parts by weight of the urethane polymer (A).

According to one preferred embodiment of the invention, (D) a polyfunctional isocyanate compound is blended in the coating composition. When the polyfunctional isocyanate compound (D) is blended, terminal hydroxyl or amino groups on the urethane polymer (A) react with isocyanate groups on the polyfunctional isocyanate compound (D) to form a three-dimensional structure, resulting in the urethane resin with further improved properties. Specifically, by blending the polyfunctional isocyanate compound, improvements are made in hardness, modulus, breaking strength, heat softening point, wear resistance and slip.

The polyfunctional isocyanate compound (D) is not critical as long as it has at least three isocyanate groups in a molecule. Preferred is an isocyanurate obtained by converting a difunctional isocyanate compound into a trimer. Another preferred polyfunctional isocyanate compound is obtained by reacting (c) a polyhydric alcohol with (d) a difunctional isocyanate compound. In this reaction, the molar ratio of terminal functional groups in the respective reactants, that is, (terminal hydroxyl groups in reactant (c))/(NCO groups in reactant (d)), simply represented by (c)/(d), is set less than 0.5.

The difunctional isocyanate compounds used herein are the same as exemplified above for reactant (b). By subjecting the difunctional isocyanate compound to reaction in a suitable solvent in the presence of a trimer-forming catalyst, a trimer isocyanurate is obtainable. The solvent used herein may be the same as previously described. Inter alia, ketone, ester and ether solvents are preferred since trimer isocyanurates are well soluble therein. Examples of the trimer-forming catalyst include amine compounds such as N,N,N', N'-tetramethyl-1,3-butanediamine, 1,4-diazabicyclo(2,2,2) octane, and 1,8-diazabicyclo(5,4,0)undecene-7, and phosphorus compounds such as triethylphosphine and tributylphosphine. They may be use alone or in admixture of two or more. The trimer-forming catalyst may be used in a catalytic amount.

In effecting reaction, a reactor is charged with the difunctional isocyanate compound, a solvent is added for dissolving the reactant therein, and a trimer-forming catalyst is added. The reaction mixture is ripened at 50 to 150° C. for 1 to 10 hours and then worked up. The reaction product may be concentrated, diluted or solvent exchanged, if necessary for adjusting the viscosity, solid concentration or solvent type.

Examples of the polyhydric alcohol compound (c) include glycerol, trimethylol propane, and pentaerythritol, polyether polyols thereof having ethylene oxide or propylene oxide added thereto, and polyacrylic polyols having a hydroxyl group-containing polymerizable monomer copolymerized therewith such as hydroxyethyl methacrylate and trimethylolpropane monomethacrylate. They may be use alone or in admixture of two or more.

The difunctional isocyanate compounds (d) used herein are the same as exemplified above for reactant (b).

A polyfunctional isocyanate compound may be obtained by reacting reactants (c) and (d) in a suitable solvent in the presence of a urethane-forming catalyst. The solvent used herein may be the same as previously described. Inter alia, ketone, ester and ether solvents are preferred since the polyfunctional isocyanate compound is well soluble therein.

Examples of the urethane-forming catalyst include organic tin compounds such as dibutyltin dilaurate and stannous octoate, and amine compounds such as N,N,N', N'-tetramethyl-1,3-butanediamine, 1,4-diazabicyclo(2,2,2)-octane, and 1,8-diazabicyclo (5,4,0)undecene-7. These catalysts may be used alone or in combination of two or more. The organic tin compounds are preferably used because of high activity.

In order to leave terminal isocyanate groups, reactants (c) and (d) are reacted in such amounts that the molar ratio of terminal functional groups in the respective reactants may be less than 0.5, that is, (c)/(d)<0.5, and especially 0.4<(c)/(d) <0.5. In effecting reaction, a reactor is charged with reactants (c) and (d), a solvent is added for dissolving the reactants therein, and a urethane-forming catalyst is added. Then the reaction mixture is ripened at 50 to 150° C. for 1 to 10 hours. The end of reaction is identified by IR spectroscopy when the peak at 3500 $cm^{-1}$ attributable to the hydroxyl group disappears. The reaction product may be concentrated, diluted or solvent exchanged, if necessary for adjusting the viscosity, solid concentration or solvent type.

Preferably the amount of the polyfunctional isocyanate compound (D) blended is adjusted so as to provide desired properties for a particular purpose. For the application as coating on key pads and rolls, it is preferred to blend 1 to 150 parts, and especially 10 to 50 parts by weight (as solids) of the polyfunctional isocyanate compound (D) per 100 parts by weight (as solids) of the urethane polymer (A). With less amounts of component (D), the advantage of three-dimensional crosslinking may be lost. Excessive amounts of component (D) may give rise to such problems as a brittle surface protective layer and an extremely short pot-life.

If the urethane polymer (A) is mixed with the polyfunctional isocyanate compound (D), reaction will take place with time. For this reason, in the embodiment wherein the polyfunctional isocyanate compound (D) is blended, the composition must be formulated in two parts, so that the polyfunctional isocyanate compound (D) is mixed with other components immediately before use.

To the urethane resin coating composition of the invention, a diluent may be added for adjusting the viscosity so as to comply with a particular application technique, and a hydrosilylation reaction retarder be added for adjusting the pot-life and curing conditions. For the application as coating on key pads, fillers, reinforcements, matte agents, dyes and pigments are optionally blended. For the application as coating on rolls, conductive agents, charge controlling agents, heat resistance modifiers, flame retardants, lubricants, parting agents, stabilizers, antistatic agents, and UV absorbers are optionally blended.

The urethane resin coating composition of the invention is applicable to a variety of metal, plastic and rubber members. The composition is especially effective when silicone rubber members, for example, key pads and rolls are produced by forming a urethane resin coating or surface protective layer on their surface. There are obtained silicone rubber members exhibiting improved wear resistance at the surface.

The substrate or base of the silicone rubber member is not critical. Substrates of millable silicone rubber accompanied by peroxide vulcanization and substrates of injection molding liquid silicone rubbers subject to hydrosilylation crosslinking are useful although the invention is not limited thereto.

Any desired technique may be used in applying the urethane resin coating composition of the invention to the silicone rubber substrate. Screen printing, spray coating and dip coating are appropriate. After application, the coating is dried by heating at 50 to 200° C. for 5 minutes to 2 hours. During the period, the solvent in the urethane resin coating composition will volatilize. At the same time, the components in the coating composition partially penetrate into the silicone rubber where hydrosilylation reaction takes place in a combined fashion among aliphatic unsaturated hydrocarbon groups on the urethane polymer (A), hydrosilyl groups on the organohydrogenpolysiloxane (B), and residual vinyl and/or hydrosilyl groups in the silicone rubber in the presence of the hydrosilylation catalyst (C). In the embodiment wherein the polyfunctional isocyanate compound (D) is blended in the coating composition, terminal hydroxyl or amino groups on the urethane polymer (A) react with isocyanate groups on the isocyanate compound (D) to form a three-dimensional structure, which reaction takes place in unison with the above hydrosilylation reaction.

The surface protective layer formed on the substrate surface from the urethane resin coating composition of the invention may have any desired thickness. For the coating on key pads, a thickness of about 1 to 100 μm, especially about 10 to 30 μm is preferred. For the coating on rolls, a thickness of about 5 to 200 μm, especially about 20 to 100 μm is preferred.

A conventional technique may be employed in forming a surface protective layer on a surface of a silicone rubber substrate. There is no need to use a silicone rubber specially formulated for enhanced adhesion to the surface protective layer. Also there is no need for cumbersome pre-treatment on the silicone rubber substrate surface such as primer treatment, ozone treatment or etching. As compared with the application of prior art urethane resin coating compositions, pre-treatment steps can be simplified. A silicone rubber member having improved wear resistance on the surface is obtainable by simply replacing a prior art urethane resin coating composition by the inventive urethane resin coating composition, without a need for any change on the remaining material, production apparatus and process (e.g., production conditions). This contributes to a reduced cost for the manufacture of the silicone rubber member.

EXAMPLE

Examples of the invention are given below by way of illustration and not by way of limitation.

Preparation Example 1

Synthesis of Urethane Polymer No. 1

A 1-liter flask equipped with a thermometer and stirrer was charged with 111.0 g (OH: 0.074 mol) of a polyether diol having a vinyl group on a side chain represented by the formula (9) below (molecular weight: 3000, n:m:o= 30:50:20), 9.0 g (NCO: 0.072 mol) of 4,4'-diphenylmethane diisocyanate, and 300 ml of methyl isobutyl ketone, which were stirred for dissolution.

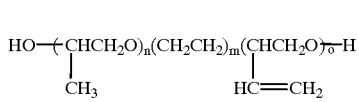

(9)

Dibutyltin dilaurate, 0.1 g, was added to the solution, which was ripened at 80° C. for 5 hours. A sample taken from the reaction product was analyzed by IR spectroscopy, finding no peak attributable to the isocyanate group. The reaction product was diluted with methyl isobutyl ketone to a solid concentration of 20% by weight. This is designated urethane polymer No. 1 (UP-1). The polymer had a weight average molecular weight of about 129,000 as measured by GPC.

Comparative Preparation Example 1

Synthesis of Urethane Polymer No. 2

The same reactor as used in Preparation Example 1 was charged with 111.0 g (OH: 0.074 mol) of a polyether diol represented by the formula (10) below (molecular weight: 3000, n:m=50;50), 9.0 g (NCO; 0.072 mol) of 4,4'-diphenylmethane diisocyanate, and 300 ml of methyl isobutyl ketone, which were stirred for dissolution.

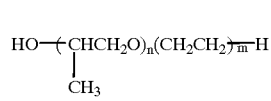

(10)

Dibutyltin dilaurate, 0.1 g, was added to the solution, which was ripened at 80° C. for 5 hours. A sample taken from the reaction product was analyzed by IR spectroscopy, finding no peak attributable to the isocyanate group. The reaction product was diluted with methyl isobutyl ketone to a solid concentration of 20% by weight. This is designated urethane polymer No. 2 (UP-2). The polymer had a weight average molecular weight of about 125,000 as measured by GPC.

Preparation Example 2

Synthesis of Urethane Polymer No. 3

The same reactor as used in Preparation Example 1 was charged with 81.0 g (OH: 0.054 mol) of a polyether diol having a vinyl group on a side chain represented by the above formula (9) (molecular weight: 3000, n:m:o= 30:50:20), 9.0 g (NCO: 0.072 mol) of 4,4'-diphenylmethane diisocyanate, and 300 ml of methyl isobutyl ketone, which were stirred for dissolution.

Dibutyltin dilaurate, 0.1 g, was added to the solution, which was ripened at 80° C. for 2 hours. The reaction solution was once cooled down to room temperature before 0.9 g (OH: 0.020 mol) of 1,4-butane diol was added to the reaction solution, which was ripened at 80° C. for 5 hours. A sample taken from the reaction product was analyzed by IR spectroscopy, finding no peak attributable to the isocyanate group. The reaction product was diluted with methyl isobutyl ketone to a solid concentration of 20% by weight. This is designated urethane polymer No. 3 (UP-3).

The polymer had a weight average molecular weight of about 95,000 as measured by GPC.

Comparative Preparation Example 2

Synthesis of Urethane Polymer No. 4

The same reactor as used in Preparation Example 1 was charged with 81.0 g (OH: 0.054 mol) of a polyether diol represented by the above formula (10) (molecular weight: 3000, n:m=50:50), 9.0 g (NCO: 0.072 mol) of 4,4'-diphenylmethane diisocyanate, and 300 ml of methyl isobutyl ketone, which were stirred for dissolution. Dibutyltin dilaurate, 0.1 g, was added to the solution, which was ripened at 80° C. for 2 hours. The reaction solution was once cooled down to room temperature before 0.9 g (OH: 0.020 mol) of 1,4-butane diol was added to the reaction solution, which was ripened at 800° C. for 5 hours. A sample taken from the reaction product was analyzed by IR spectroscopy, finding no peak attributable to the isocyanate group. The reaction product was diluted with methyl isobutyl ketone to a solid concentration of 20% by weight. This is designated urethane polymer No. 4 (UP-4). The polymer had a weight average molecular weight of about 92,000 as measured by GPC.

Preparation Example 3

Synthesis of Urethane Polymer No. 5

The same reactor as used in Preparation Example 1 was charged with 81.0 g (OH: 0.054 mol) of a polysiloxane-containing polyester diol having a vinyl group on a side chain represented by the formula (11) below (molecular weight: 3000, polysiloxane molecular weight: 2000, p:q=80:20), 9.0 g (NCO: 0.072 mol) of 4,4"-diphenylmethane diisocyanate, and 300 ml of methyl isobutyl ketone, which were stirred for dissolution.

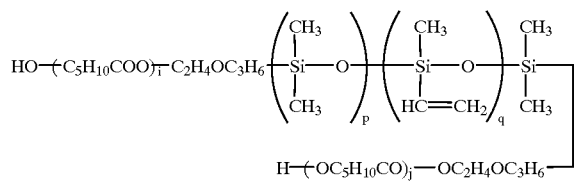

(11)

Dibutyltin dilaurate, 0.1 g, was added to the solution, which was ripened at 80° C. for 2 hours. The reaction solution was once cooled down to room temperature before 0.9 g (OH: 0.020 Mol) of 1,4-butane diol was added to the reaction solution, which was ripened at 80° C. for 5 hours. A sample taken from the reaction product was analyzed by IR spectroscopy, finding no peak attributable to the isocyanate group. The reaction product was diluted with methyl isobutyl ketone to a solid concentration of 20% by weight. This is designated urethane polymer No. 5 (UP-5). The polymer had a weight average molecular weight of about 117,000 as measured by GPC.

Comparative Preparation Example 3

Synthesis of Urethane Polymer No. 6

The same reactor as used in Preparation Example 1 was charged with 111.0 g (OH: 0.074 mol) of a polysiloxane-containing polyester diol represented by the formula (12) below (molecular weight: 3000, polysiloxane molecular weight: 2000), 9.0 g (NCO: 0.072 mol) of 4,4'-diphenylmethane diisocyanate, and 300 ml of methyl isobutyl ketone, which were stirred for dissolution.

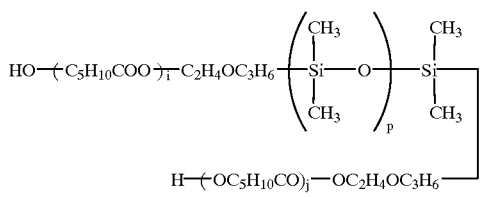

(12)

Dibutyltin dilaurate, 0.1 g, was added to the solution, which was ripened at 80° C. for 5 hours. A sample taken from the reaction product was analyzed by IR spectroscopy, finding no peak attributable to the isocyanate group. The reaction product was diluted with methyl isobutyl ketone to a solid concentration of 20% by weight. This is designated urethane polymer No. 6 (UP-6). The polymer had a weight average molecular weight of about 113,000 as measured by GPC.

Preparation Example 4

Synthesis of Polyfunctional Isocyanate Compound No. 7

A 500-ml flask equipped with a thermometer and stirrer was charged with 26.8 g (OH: 0.60 mol) of trimethylol propane, 107.9 g (NCO: 1.24 mol) of tolylene diisocyanate (a mixture of 2,4- and 2,6-), and 100 ml of butyl acetate, which were stirred for dissolution. Dibutyltin dilaurate, 0.05 g, was added to the solution, which was ripened at 80° C. for 2 hours. A sample taken from the reaction product was analyzed by IR spectroscopy, finding no peak attributable to the hydroxyl group, but the peak attributable to the isocyanate group. The reaction product was diluted with butyl acetate to a solid concentration of 50% by weight. This is designated polyfunctional isocyanate compound No. 7.

Preparation Example 5

Synthesis of Polyfunctional Isocyanate Compound No. 8

A 500-ml flask equipped with a thermometer, stirrer and dropping funnel was purged with nitrogen, charged with 100 ml of butyl acetate, and heated at 70° C. with stirring. A solution of 78.0 g (OH: 0.60 mol) of 2-hydroxyethyl methacrylate and 0.5 g of 2,2'-azobis(2-methylbutyronitrile) was added dropwise to the flask from the dropping funnel. After the completion of dropwise addition, the reaction solution was ripened at 80° C. for 2 hours. For a sample taken from the reaction solution, a heat loss was measured to find an approximately theoretical value, indicating the formation of a 2-hydroxyethyl methacrylate polymer. The reaction solution was once cooled to room temperature before 107.9 g (NCO: 1.24 mol) of tolylene diisocyanate (a mixture of 2,4- and 2,6-) and 0.05 g of dibutyltin dilaurate were added to the reaction solution, which was ripened at 80° C. for 2 hours. A sample taken from the reaction product was analyzed by IR spectroscopy, finding no peak attributable to the hydroxyl group, but the peak attributable to the isocyanate group. The reaction product was diluted with butyl acetate to a solid concentration of 50% by weight. This is designated polyfunctional isocyanate compound No. 8.

Examples 1–9 & Comparative Examples 1–27

To 100 parts by weight of millable silicone rubber compound "KE-951U" (Shin-Etsu Chemical Co., Ltd.) was added 0.6 part by weight of a crosslinking agent "C-8A" (Shin-Etsu Chemical Co., Ltd.). The blend was admitted into a sheet mold of 100 mm long, 50 mm wide, and 2 mm thick where it was heat compression molded at 180° C. and 100 kgf/cm² for 10 minutes, obtaining a silicone rubber sheet A.

Separately, both 50 parts by weight of injection molding liquid silicone rubbers "KE-1990-50A" and "KE-1990-50B" (Shin-Etsu Chemical Co., Ltd.) were thoroughly admixed. The mixture was admitted into a sheet mold of 100 mm long, 50 mm wide, and 2 mm thick where it was heat compression molded at 150° C. and 100 kgf/cm² for 10 minutes, obtaining a silicone rubber sheet B.

To the two types of rubber sheets A and B, coating solutions of the composition shown in Tables 1 to 4 were applied by spray coating. The coatings were heated in an oven at 150° C. for 10 minutes for drying, obtaining transparent surface protective layers of about 20 μm thick. An adhesion test was carried out on the surface protective layers of different coating compositions. The results are shown in Tables 1 to 4.

Primer-coated silicone rubber sheets C and D were obtained by spray coating "Primer C" (Shin-Etsu Chemical Co., Ltd.) onto the two types of rubber sheets A and B, respectively, followed by air drying and heat drying in an oven at 100° C. for 3 minutes. On these two types of rubber sheets C and D, surface protective layers were similarly formed by applying the coating solutions and heat drying. An adhesion test was carried out on the transparent surface protective layers of about 20 μm thick. The results are also shown in Tables 1 to 4.

Examples 10–16

To 100 parts by weight of millable silicone rubber compound "KE-971U" (Shin-Etsu Chemical Co., Ltd.) was added 0.6 part by weight of a crosslinking agent "C-8A" (Shin-Etsu Chemical Co., Ltd.). The blend was admitted into a mold defining a cavity consisting of a key top portion, thin gage flexible portion and base portion where it was heat compression molded at 180° C. and 100 kgf/cm² for 10 minutes, obtaining a silicone rubber key pad consisting of the key top portion, thin gage flexible portion and base portion.

Next, to 100 parts by weight of an ink base "Silmark BLM" (Shin-Etsu Chemical Co., Ltd.) were added 8 parts by weight of a crosslinking agent "CAT-TM" (Shin-Etsu Chemical Co., Ltd.) and 0.3 part by weight of a curing catalyst "CAT-PL-2" (Shin-Etsu Chemical Co., Ltd.). The blend was diluted with 100 parts by weight of xylene, yielding a black, character-printing silicone rubber base ink. Onto the key top portion of the silicone rubber key pad produced above, a test pattern was printed with the character-printing silicone rubber base ink by screen printing. Heat drying in an oven at 150° C. for 5 minutes yielded a character ink layer of about 10 μm thick. Each of the urethane resin coating solutions of Examples 1 to 7 was applied onto the ink layer-bearing silicone rubber key pad by screen printing, followed by heat drying in an oven at 150° C. for 5 minutes. There was obtained a silicone rubber key pad having a transparent surface protective layer of about 10 μm thick formed thereon.

Examples 17–23

To 100 parts by weight of millable silicone rubber compound "KE-941U" (Shin-Etsu Chemical Co., Ltd.) were added 0.6 part by weight of a crosslinking agent "C-8A" (Shin-Etsu Chemical Co., Ltd.) and 20 parts by weight of carbon black. The silicone rubber compound was admitted into a roll mold having a metal core of SUS stainless steel having a diameter of 5 mm and a length of 300 mm set therein. The mold was placed in an oven where the compound was heat vulcanized at 180° C. for 30 minutes, forming a silicone rubber layer having a thickness of 5 mm and an axial length of 200 mm around the metal core. The product was removed from the mold, yielding a primary vulcanized silicone rubber roll. This primary vulcanized silicone rubber roll was held in an oven at 200° C. for 4 hours, yielding a secondary vulcanized silicone rubber roll. Each of the urethane resin coating solutions of Examples 1 to 7 was applied onto the roll by spray coating, followed by heat drying in an oven at 150° C. for 10 minutes. There was obtained a conductive roll having a transparent surface protective layer of about 30 μm thick formed thereon.

It is noted that throughout Tables 1 to 4, methylhydrogenpolysiloxane is of the following formula:

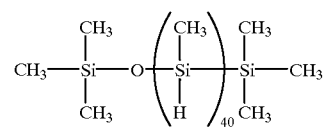

CAT-PL-50T is a hydrosilylation catalyst in the form of a platinum complex (Shin-Etsu Chemical Co., Ltd.), and the controlling agent is 1-ethynyl-1-cyclohexanol.

Table 1–Table 4

TABLE 1

| Composition | Comparative Example | | | | | | | | |
|---|---|---|---|---|---|---|---|---|---|
| (pbw) | 1 | 2 | 3 | 4 | 5 | 6 | 7 | 8 | 9 |
| UP-1 | 100 | 100 | 100 | | | | | | |
| UP-2 | | | | | | | | | |
| UP-3 | | | | 100 | 100 | 100 | | | |
| UP-4 | | | | | | | | | |
| UP-5 | | | | | | | 100 | 100 | 100 |
| UP-6 | | | | | | | | | |
| Polyfunctional isocyanate No. 7 | | 5 | | | 5 | | | 5 | |
| Polyfunctional isocyanate No. 8 | | | 5 | | | 5 | | | 5 |
| Methylhydrogenpolysiloxane | 2 | 2 | 2 | 2 | 2 | 2 | 2 | 2 | 2 |

TABLE 1-continued

| Composition | Comparative Example | | | | | | | | |
|---|---|---|---|---|---|---|---|---|---|
| (pbw) | 1 | 2 | 3 | 4 | 5 | 6 | 7 | 8 | 9 |
| CAT-PL-50T | 0.5 | 0.5 | 0.5 | 0.5 | 0.5 | 0.5 | 0.5 | 0.5 | 0.5 |
| Controlling agent | 0.2 | 0.2 | 0.2 | 0.2 | 0.2 | 0.2 | 0.2 | 0.2 | 0.2 |
| Adhesion | | | | | | | | | |
| Rubber sheet A | ○ | ○ | ○ | ○ | ○ | ○ | ○ | ○ | ○ |
| Rubber sheet B | ○ | ○ | ○ | ○ | ○ | ○ | ○ | ○ | ○ |
| Rubber sheet C | — | — | — | — | — | — | — | — | — |
| Rubber sheet D | — | — | — | — | — | — | — | — | — |

TABLE 2

| Composition | Comparative Example | | | | | | | | |
|---|---|---|---|---|---|---|---|---|---|
| (pbw) | 1 | 2 | 3 | 4 | 5 | 6 | 7 | 8 | 9 |
| UP-1 | 100 | 100 | 100 | | | | | | |
| UP-2 | | | | | | | | | |
| UP-3 | | | | 100 | 100 | 100 | | | |
| UP-4 | | | | | | | | | |
| UP-5 | | | | | | | 100 | 100 | 100 |
| UP-6 | | | | | | | | | |
| Polyfunctional isocyanate No. 7 | | 5 | | | 5 | | | 5 | |
| Polyfunctional isocyanate No. 8 | | | 5 | | | 5 | | | 5 |
| Methylhydrogenpolysiloxane | | | | | | | | | |
| CAT-PL-50T | | | | | | | | | |
| Controlling agent | | | | | | | | | |
| Adhesion | | | | | | | | | |
| Rubber sheet A | X | X | X | X | X | X | X | X | X |
| Rubber sheet B | X | X | X | X | X | X | X | X | X |
| Rubber sheet C | ○ | ○ | ○ | ○ | ○ | ○ | ○ | ○ | ○ |
| Rubber sheet D | ○ | ○ | ○ | ○ | ○ | ○ | ○ | ○ | ○ |

TABLE 3

| Composition | Comparative Example | | | | | | | | |
|---|---|---|---|---|---|---|---|---|---|
| (pbw) | 10 | 11 | 12 | 13 | 14 | 15 | 16 | 17 | 18 |
| UP-1 | | | | | | | | | |
| UP-2 | 100 | 100 | 100 | | | | | | |
| UP-3 | | | | | | | | | |
| UP-4 | | | | 100 | 100 | 100 | | | |
| Up-5 | | | | | | | | | |
| UP-6 | | | | | | | 100 | 100 | 100 |
| Polyfunctional isocyanate No. 7 | | 5 | | | 5 | | | 5 | |
| Polyfunctional isocyanate No. 8 | | | 5 | | | 5 | | | 5 |
| Methylhydrogenpolysiloxane | 2 | 2 | 2 | 2 | 2 | 2 | 2 | 2 | 2 |
| CAT-PL-50T | 0.5 | 0.5 | 0.5 | 0.5 | 0.5 | 0.5 | 0.5 | 0.5 | 0.5 |
| Controlling agent | 0.2 | 0.2 | 0.2 | 0.2 | 0.2 | 0.2 | 0.2 | 0.2 | 0.2 |
| Adhesion | | | | | | | | | |
| Rubber sheet A | X | X | X | X | X | X | X | X | X |
| Rubber sheet B | X | X | X | X | X | X | X | X | X |
| Rubber sheet C | ○ | ○ | ○ | ○ | ○ | ○ | ○ | ○ | ○ |
| Rubber sheet D | ○ | ○ | ○ | ○ | ○ | ○ | ○ | ○ | ○ |

TABLE 4

| Composition (pbw) | Comparative Example | | | | | | | | |
|---|---|---|---|---|---|---|---|---|---|
| | 19 | 20 | 21 | 22 | 23 | 24 | 25 | 26 | 27 |
| UP-1 | | | | | | | | | |
| UP-2 | 100 | 100 | 100 | | | | | | |
| UP-3 | | | | | | | | | |
| UP-4 | | | | 100 | 100 | 100 | | | |
| UP-5 | | | | | | | | | |
| UP-6 | | | | | | | 100 | 100 | 100 |
| Polyfunctional isocyanate No. 7 | | 5 | | | 5 | | | 5 | |
| Polyfunctional isocyanate No. 8 | | | 5 | | | 5 | | | 5 |
| Methylhydrogenpolysiloxane | | | | | | | | | |
| CAT-PL-50T | | | | | | | | | |
| Controlling agent | | | | | | | | | |
| Adhesion | | | | | | | | | |
| Rubber sheet A | X | X | X | X | X | X | X | X | X |
| Rubber sheet B | X | X | X | X | X | X | X | X | X |
| Rubber sheet C | ○ | ○ | ○ | ○ | ○ | ○ | ○ | ○ | ○ |
| Rubber sheet D | ○ | ○ | ○ | ○ | ○ | ○ | ○ | ○ | ○ |

There has been described a urethane resin coating composition which firmly bonds to surfaces of various substrates, especially silicone rubber substrates, without a need for pre-treatment and readily forms thereon a surface protective layer having improved wear resistance. The silicone rubber member whose surface is protected with the inventive coating composition maintains the properties of the silicone rubber substrate intact, is endowed on the surface with the wear resistance inherent to urethane resin, has overcome the problems of contact failure and low molecular weight siloxanes, and is thus useful as silicone rubber key pads and silicone rubber rolls.

Japanese Patent Application No. 11-200283 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A coating composition comprising
   (A) 100 parts by weight of a urethane polymer having at least one aliphatic unsaturated hydrocarbon group on a side chain in a molecule,
   (B) 0.1 to 100 parts by weight of an organohydrogenpolysiloxane having at least two hydrosilyl groups in a molecule,
   (C) a catalytic amount of a hydrosilylation catalyst, and
   (D) 1 to 150 parts by weight of a polyfunctional isocyanate compound.

2. The coating composition of claim 1 wherein the urethane polymer (A) is obtained by reacting (a) a straight chain polymer having a hydroxyl or amino group at each end and at least one aliphatic unsaturated hydrocarbon group on a side chain and optionally a low molecular weight chain extender with (b) a difunctional isocyanate compound, with the molar ratio of terminal functional groups in (a) to (b) being greater than 1.0.

3. The coating composition of claim 2 wherein the straight chain polymer (a) having a hydroxyl or amino group at each end and at least one aliphatic unsaturated hydrocarbon group on a side chain further has siloxane bonds.

4. The coating composition of claim 1 wherein the polyfunctional isocyanate compound (D) is an isocyanurate compound obtained by converting a difunctional isocyanate compound into a trimer.

5. The coating composition of claim 1 wherein the polyfunctional isocyanate compound (D) is obtained by reacting (c) a polyhydric alcohol with (d) a difunctional isocyanate compound, with the molar ratio of terminal functional groups in (c) to (d) being less than 0.5.

6. The coating composition of claim 1 wherein the urethane polymer (A) is obtained by reacting (a) a straight chain polymer having a hydroxyl or amino group at each end and at least one aliphatic unsaturated hydrocarbon group on a side chain and optionally a low molecular weight chain extender with (b) a difunctional isocyanate compound, with the molar ratio of terminal functional groups in (a) to (b) being greater than 1.0, wherein the reaction takes place in a solvent and/or the presence of a urethane-forming catalyst.

7. The coating composition of claim 1 further comprising a diluent.

8. The coating composition of claim 1 further comprising a filler, a reinforcement, a matte agent, a dye, a pigment, a conductive agent, a charge controlling agent, a heat resistance modifier, a flame retardant, a lubricant, a parting agent, a stabilizer, an antistatic agent, or a UV absorbent.

9. A metal, plastic, or rubber member having a coating composition of claim 1 applied thereto.

10. A silicone rubber member comprising a silicone rubber substrate and a surface protective layer of the coating composition of claim 1 formed on a surface of the substrate.

11. The silicone rubber member of claim 10 which is a silicone rubber key pad.

12. The silicone rubber member of claim 10 which is a silicone rubber roll.

* * * * *